RECEIVER ASSEMBLY

Filed Aug. 23, 1960 3 Sheets-Sheet 1

INVENTORS.
Edwin O. Stastny,
Donald F. Reinertson,
Rudolph W. Krolopp,
By Mueller & Aichele Atty's.

INVENTORS.
Edwin O. Stastny,
Donald F. Reinertson,
Rudolph W. Krolopp,
By Mueller & Aichele Att'ys.

April 23, 1963 E. O. STASTNY ETAL 3,087,013

RECEIVER ASSEMBLY

Filed Aug. 23, 1960 3 Sheets-Sheet 3

INVENTORS.
Edwin O. Stastny,
Donald F. Reinertson,
Rudolph W. Krolopp
By Mueller & Aichele Attys.

1

3,087,013
RECEIVER ASSEMBLY

Edwin O. Stastny, Lombard, Donald F. Reinertson, Chicago, and Rudolph W. Krolopp, Villa Park, Ill., assignors to Motorola, Inc., Chicago, Ill., a corporation of Illinois Filed Aug. 23, 1960, Ser. No. 51,388
7 Claims. (Cl. 178—7.9)

This invention relates generally to television receivers and more particularly to a receiver assembly which may be constructed as a compact portable unit having an attractive appearance and simplified but sturdy mechanical construction.

With the various improvements in present day transistors considerable attention has been directed to transistorizing of communication products. All transistorized radio or television receivers, for example, would generally have the advantages of smaller size, reduced power drain, and cooler and more reliable operation than would the related tube type units. All of these advantages are also particularly worthwhile attributes for portable receivers which are battery operated.

While large screen size transistorized television receivers have not been commercially available heretofore, such receivers operating entirely by means of a self-contained battery are now being built by the assignee of the present invention. It may be seen that an entirely self-contained television receiver, requiring no more than the presence of television signal energy for proper operation, should be constructed in compact and rugged form to withstand the rigors of varied and frequent transportation and should also present an attractive appearance with a minimum of distracting functional fixtures on the cabinet. Moreover, a compact portable television receiver is commercially practical only if it may be serviced with facility and assembled and tested in an economical manner.

Accordingly, it is an object of this invention to provide an improved television receiver assembly of attractive appearance, compact form, and rugged construction.

Another object is to reduce to a minimum the number of housing parts of a television receiver assembly and to facilitate assembly or disassembly thereof for more economical repair and manufacture.

A further object is to improve the physical protection of a portable-type television receiver.

Still another object is to simplify and improve the construction of the supporting frame means for a television picture tube and associated circuit components for cooler operation of the receiver and greater ease of assembly and handling of an operative receiver subassembly.

A feature of the invention is a provision of a television receiver assembly with a receiver circuit mounted in a supporting frame as a unitary subassembly, a bezel encircling the cathode ray tube screen of the receiver and a one-piece molded cabinet housing fitted to the bezel and enclosing the sides, top, bottom and back to the subassembly.

Another feature is the provision of such a receiver assembly having an escutcheon plate secured to the subassembly frame on the top side of the housing and having a handle for the receiver and operating receiver controls presented in a convenient and attractive position.

A further feature is the provision of such a receiver assembly having a removable cover for the cathode ray tube screen, which cover is clipped by improved latches to the bezel for protection of the screen and its protective window during transportation of the receiver.

Another feature of the invention is the provision of a two-section removable housing for a unitary subassembly of a television receiver which subassembly is formed by a frame and clamp for a cathode ray tube and a panel-like receiver component chassis joined together by brackets. The cathode ray tube and component chassis are easily separable to facilitate complete access to the receiver circuitry for repair purposes.

2

In a specific form of the invention the receiver assembly includes a television receiver circuit including a cathode ray tube and circuit components mounted in a compact form as a subassembly. A decorative bezel is secured to the frame of the subassembly and this bezel encircles the cathode ray tube screen. A one-piece, molded cabinet housing is mated with a channel in the bezel for enclosing the sides, bottom, back and a part of the top of the receiver subassembly. The controls for the receiver are arranged on the top side of the subassembly and an escutcheon plate presents means for fully enclosing the top of the assembly. The escutcheon plate is also secured to the frame and includes a carrying handle for the device. The bezel may further incorporate an inwardly turned interior ledge formed to grip a corresponding lip about the periphery of a transparent protective window for the cathode ray tube screen. Suitable clips attached to the subassembly frame clamp and retain this window and a screen mask for the cathode ray tube. For further protection of the tube screen and protective window a cabinet cover may be detachably clipped to the bezel. The flat component chassis of the subassembly, which is preferably supported in an upright position, is secured by means of struts or brackets to a subframe which encircles the cathode ray tube and to which this tube is clamped. The component chassis thus can be readily separated for access to the circuitry supported on the sides thereof or the cathode ray tube can be demounted in its clamp mounting to permit full access to the circuit components on the chassis for test or repair purposes. The subassembly accordingly forms a relatively open structure which is fully operative as a completely unhoused receiver for alignment during manufacturing or repair.

Figures 1, 2, 3:
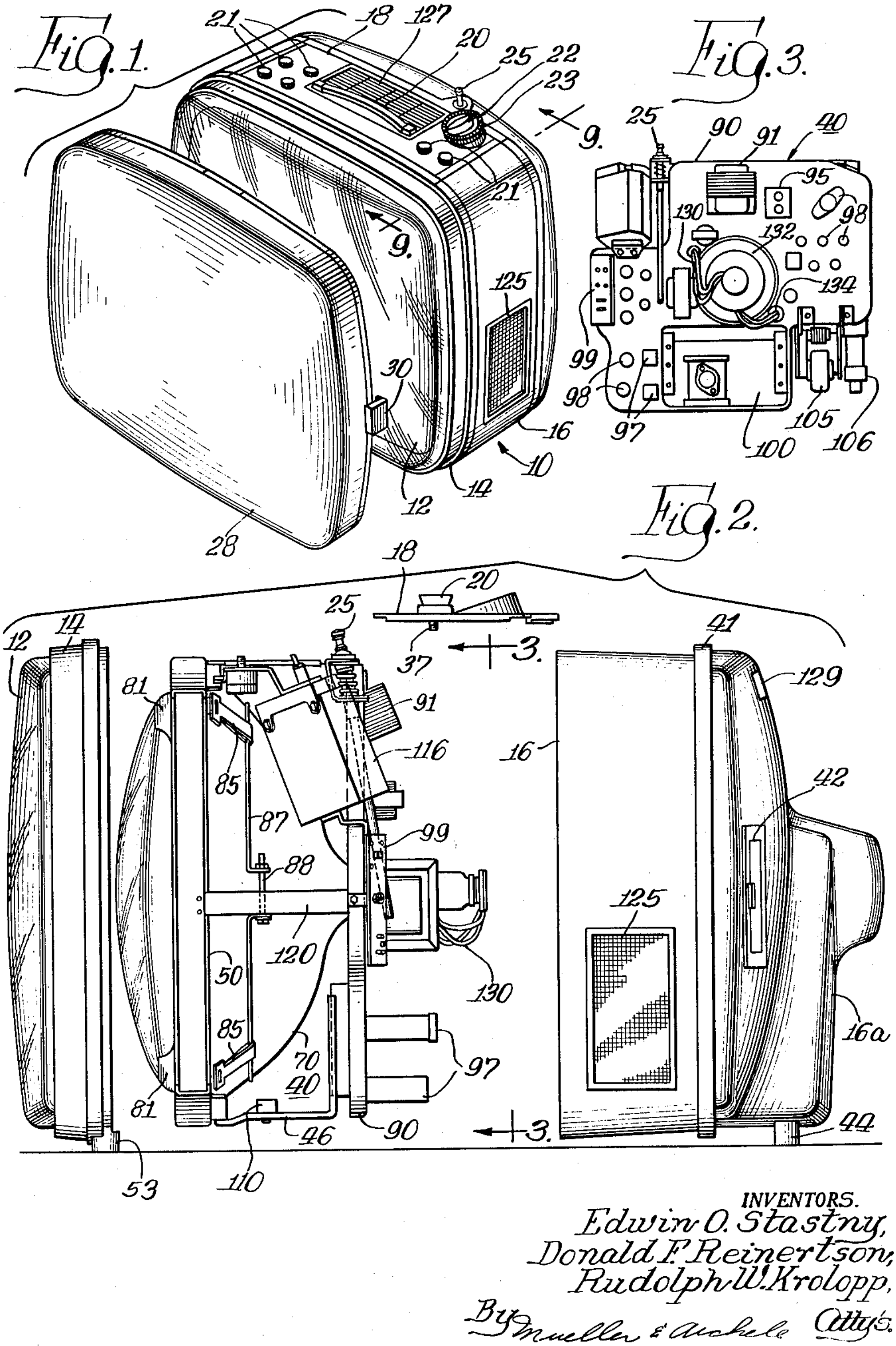
FIG. 1 is a perspective view of a television receiver constructed in accordance with the invention.
FIG. 2 is an exploded side elevational view of a portion of the receiver of FIG. 1.
FIG. 3 is a view of the receiver component chassis taken along the line 3—3 of FIG. 2.

Referring now to FIG. 1, there is shown a television receiver 10 having a protective window 12 through which the screen of a cathode ray tube is visible. The receiver also includes a bezel 14 encircling the front periphery of the receiver, a cabinet housing 16 for enclosing the receiver. On top of the receiver 10 there is an escutcheon plate 18, a carrying handle 20 and control knob 21 positioned on each side of the handle 20 for such adjustments as picture contrast, brightness, horizontal hold, vertical hold, etc. A channel selection knob 22 and a fine tuner knob 23 are also available atop the escutcheon plate 18. The antenna rod 25 projects through an aperture in plate 18 and is in the form of a single telescoping rod which operates for signal pickup with respect to the reference ground formed by the chassis of the receiver.

Since it is contemplated that the receiver being described is fully transistorized, except for the cathode ray picture tube and perhaps a high voltage rectifier tube, and that the receiver may be fully operative by means of a self-contained battery, the receiver may be considered fully portable in the truest sense of the word. Thus, it may be expected to be transported frequently and to various locations for use during which damage to the protective window 12 or even possibly damage to the glass envelope of the cathode ray tube, could occur. Therefore, a protective cover 28 may be used to completely enclose the front of the receiver. As shown more clearly in FIG. 9, the cover 28 includes a suitable rim 29 which engages the bezel 14 to complete the enclosure around the entire periphery of the bezel. A pair of spring biased clamps 30, one on each side of the cover 28, form a means for securing the cover to the bezel 14 without the necessity for any unattractive latching means on the main body of the television receiver. The construction of latches 30 will be explained in greater detail subsequently in connection with FIGS. 10 and 11.

The construction of the exterior housing of the television receiver may best be understood by considering FIG. 2 and the disassembly of the receiver cabinet in the order in which the parts thereof might be disassembled in a practical situation. The escutcheon plate 18 is secured to the struts 35 (FIG. 4) of the receiver subassembly by means of a pair of threaded fasteners 37 (FIG. 2) which engage apertures 36 and are positioned beneath the handle 20 in order to be available for access with a tool. Obviously it is important that the handle 20 be firmly mounted and approximately aligned with the fasteners 37 to ensure a firm structural relationship between the handle and the receiver subassembly 40.

The cabinet housing 16 is preferably a one-piece molded fiberglass shell which encloses the sides, the bottom, the back and a portion of the top of the receiver subassembly 40. A portion of the top of the receiver which is not enclosed by housing 16 is, of course, enclosed by means of the escutcheon plate 18. The cabinet housing 16 may be covered with a suitable decorative material such as the thin plastic sheet (for example, styrene rubber copolymer) and the protective cover 28 may also be formed of molded fiberglass and covered with such a decorative plastic sheet. A decorative encircling band 41 is positioned about the housing 16 in order to enhance the appearance of the receiver and to add rigidity to the one-piece housing 16. However, it should be understood that the housing 16 is one integral molded piece and that it is not separated in two parts beneath the strip 41. The back surface of the housing 16 includes a hinged door 42 through which a power line cord may be connected to the receiver for recharging of the battery or operation of the receiver directly from the power line rather than its internal battery. The bottom side of the housing 16 includes a supporting foot 44 to facilitate placement of the receiver. The back side of the housing is plain and unadorned except for the door 42 and two grill-like ventilation openings and the bulged section 16a which follows the contour of the receiver battery and the base of the cathode ray picture tube. The cabinet housing 16 is secured to the subassembly 40 by means of suitable threaded fasteners engageable with apertures 45 in struts 35 (FIG. 4), and these are ordinarily concealed by the escutcheon plate 18. Further threaded fasteners extend through the bottom of housing 16 into the bottom strut 46 of the subassembly 40 (FIG. 2).

The bezel 14 is secured to the receiver subassembly 40 by means of threaded fasteners joining the top and bottom portions of this bezel to the encircling frame 50 which surrounds the cathode ray tube. Apertures 51 in the frame 50 (FIG. 4) and corresponding apertures in the lower side of this frame are for this purpose. On the top side of the receiver 10 the escutcheon plate 18 will extend over the threaded fasteners securing the bezel 14 to the frame 15 thereby concealing these. A pair of feet 53 (FIG. 2) are secured to the bottom of bezel 14 and these cooperate with the foot 44 for placement of the receiver.

Figures 6, 7, 8, 9, 10, 11:
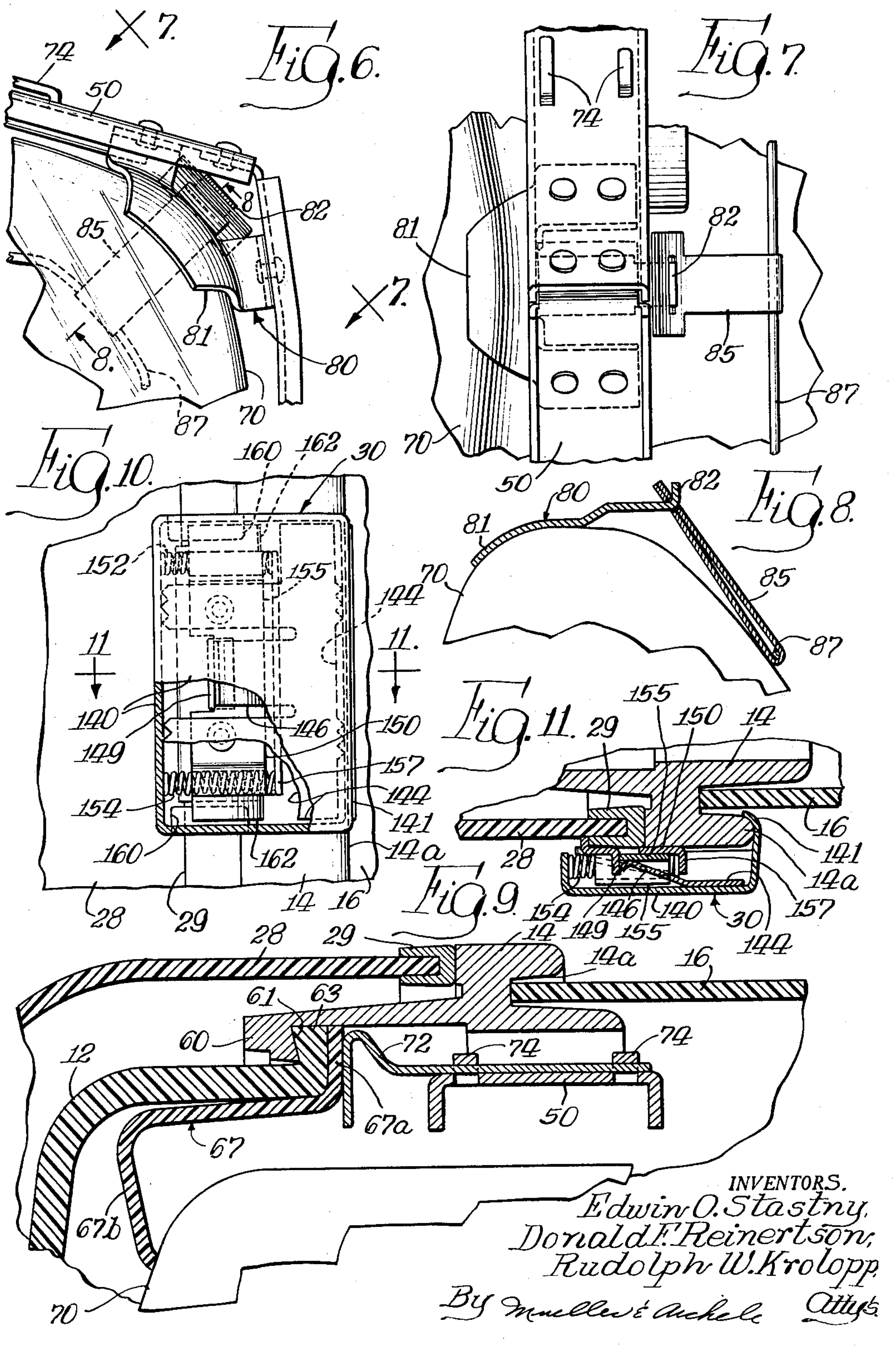
FIG. 6 is a front view of a portion of the receiver subassembly.
FIG. 7 is a plan view of the portion of the subassembly shown in FIG. 6 and taken along the line 7—7 of FIG. 6.
FIG. 8 is a sectional view along the line 8—8 of FIG. 6.
FIG. 9 is a sectional view of the receiver assembly taken along the line 9—9 of FIG. 1 (but with the protective cover attached)
FIG. 10 is a partly cut away view of the latch for the protective cover of the receiver assembly.
FIG. 11 is a sectional view along the line 11—11 of FIG. 10.

As best seen in FIG. 9, the rear edge of the bezel 14 includes an indentation or channel 14a and this extends around the entire periphery of the bezel so that the forward edge of the cabinet housing 16 may extend into this channel. This has the purpose of better sealing the receiver enclosure and also concealing the edge of the molded housing 16.

Also as seen in FIG. 9, the bezel 14 includes an inwardly turned lip 60 around the entire front of the periphery thereof and this lip has the slanted ledge 61 which engages a correspondingly slanted rim 63 about the periphery of the protective window 12. The window 12 covers the entire front surface of the receiver and the top and bottom edges and the side edges thereof are respectively parallel to one another so that the bezel 14 actually encircles the receiver rearwardly of the protective window 12 as shown in FIGS. 1, 2 and 9.

A mask 67, which may be formed of lightweight plastic, is installed within the interior of the window 12 and this mask includes an outer rim 67a which rests upon the rim 63 of the window 12. The inner edge of mask 67 is formed in such a way as to contact the face or screen of the cathode ray tube 70 to frame the raster or image formed thereon.

At the four corners of the subframe 50, which encircles the widest and generally rectangular bulbous portion of the cathode ray tube 70, there are spring clips 72 which resiliently engage the rim 67a of the mask 67 to thus urge the mask and the protective window 12 against the ledge 61 of the bezel to secure these members in place. The spring clips 72, one of which is shown in FIG. 9, are seated in place under raised bridge-like portions 74 in the frame 50 (see also FIGS. 4, 6 and 7). In assembling the bezel protective window and mask to the receiver, the clips 72 are inserted in their retaining bridges 74 and the window and mask are positioned in the bezel and the bezel is secured to the frame 50 as previously described. The resilient clips then retain the window 12 and mask 67 as shown in FIG. 9. The mask 67 is thereby simply and automatically aligned with the screen of the cathode ray tube 70 as it is supported in the frame 50. It should also be pointed out that the ledge 61 of the bezel 14 and the rim 63 of the window 12 form an interlocking structure to render the bezel and window more rigid to tend to improve the implosion stress which the protective window will withstand in case the tube 70 is broken.

Figures 4, 5:
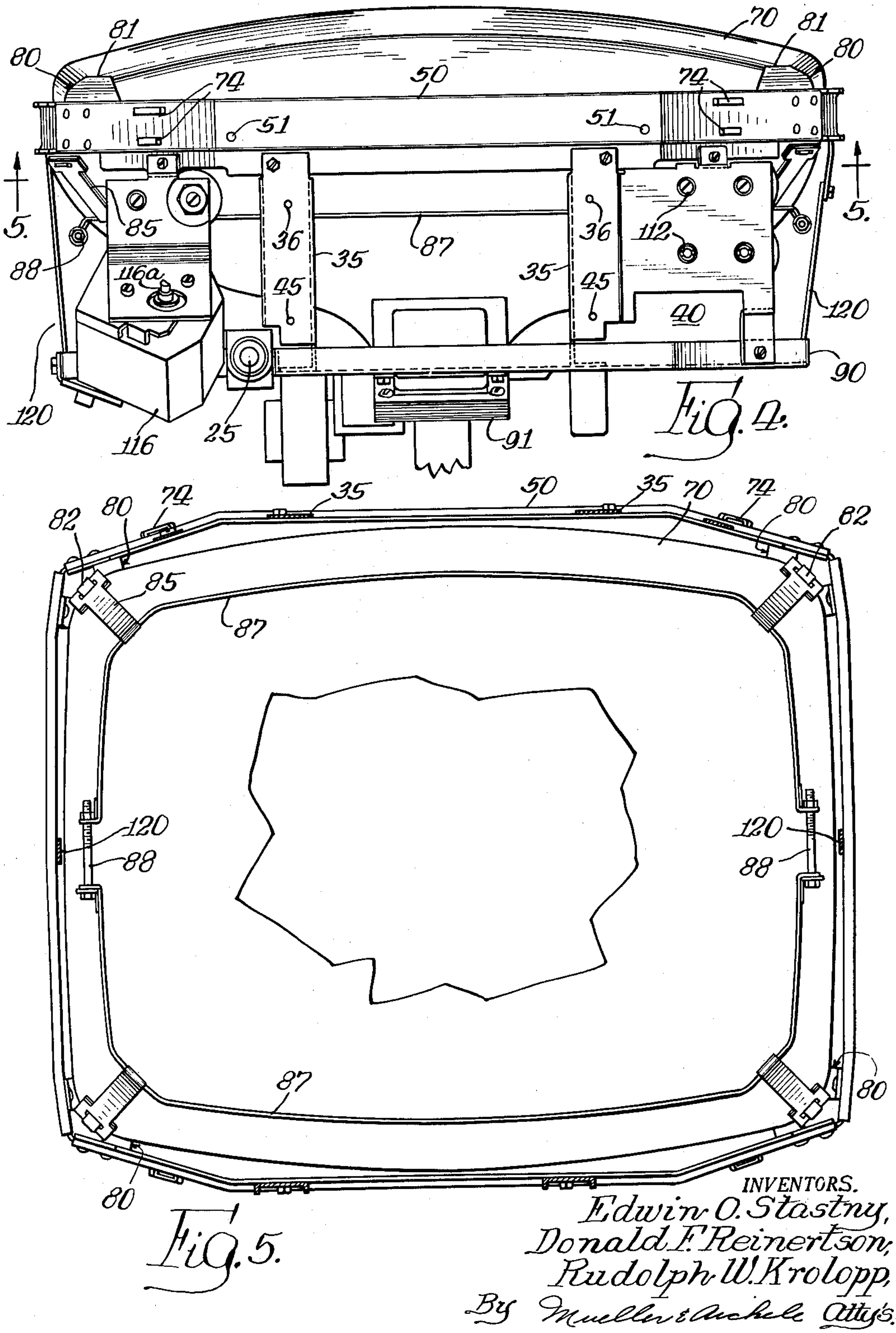
FIG. 4 is a top view of the component chassis of FIG. 3.
FIG. 5 is a sectional view along the line 5—5 of FIG. 4.

The means for mounting the cathode ray tube 70 is shown in FIGS. 4–8. Frame 50 is formed of four channel-shaped members forming respective top, bottom, and sides of this frame which encircles the rectangular shaped bulbous portion of the picture tube. At each of the four corners of the frame 50 there is a bracket 80 riveted to the two interconnecting portions of the frame at the respective corners. These brackets include inwardly turned projections 81 which extend a small distance over the face of the cathode ray tube. A further portion of each of the brackets 80 extends rearwardly and forms a hook portion 82 to which the clips 85 are attached. The clips 85 are each doubled upon themselves as best shown in FIG. 8, so that each one encircles a corner of the wire clamping frame 87. Clamping frame 87 completely encircles the back of the bulbous section of the tube 70 and this frame is tensioned sufficiently to urge the tube forward and against the projections 81 of the brackets 80. As seen in FIG. 5, frame 87 is formed in two sections which are secured together along each vertical side thereof by means of the threaded fasteners 88 so that the clamping frame may be properly tensioned.

For removal of the cathode ray picture tube 70 the threaded fasteners 88 are loosened sufficiently that the clips 85 may be unhooked from the hooks 82. The tube may then be withdrawn from the projections 81 and tilted sufficiently to clear these for removal out the front of the encircling frame 50. This clamping structure forms the sole means for supporting the cathode ray tube. As will be explained subsequently, all of the electrical connections to the cathode ray tube are of the plug type so that a tube can be readily demounted and disconnected from the receiver.

The circuit components of the television receiver 10 other than the cathode ray tube 70 will now be described generally in conjunction with FIGS. 2, 3 and 4. It may be noted that the subassembly 40 includes a flat component chassis 90 disposed in spaced and parallel relation with respect to the frame 50 and the chassis 90 carries nearly all of the circuit components of the receiver. Representative ones of these components include the power transformer 91, the rectifiers 95, transformer 97 and transistors 98. As previously stated, the receiver may be operative by means of a self-contained battery or by means of an internal power supply connected to a suitable external source of electric power such as an alternating current power line. Such an external source of power may also be used to charge a battery for the receiver and the circuitry for this power system may include the power transformer 91 and the rectifiers 95. A panel 99 (FIG. 3) is disposed in a position to be available through the door 42 (FIG. 2) so that a power line cord may be connected to the receiver. The panel 99 may also include connection means for an optional external antenna for the receiver.

A battery for the receiver may be mounted in the compartment 100 and supported therein by means of a suitable encircling strap. Further representative components of the overall transistorized television receiver include a high voltage transformer 105 and a high voltage rectifier tube 106. These elements may be connected in a high voltage system to supply a potential of the order of 15 kv. for the screen or anode of the picture tube 17. Some of the less frequently used circuit controls for the receiver such as control 110 mounted on bracket 46 (FIG. 2) may be positioned in the subassembly 40 so that the controls therefore are facing outwardly of the subassembly to simplify alignment in the completely assembled form of the subassembly 40. As previously stated, the controls normally used by a viewer of the receiver are positioned to be available on the top of the assembled device. Some of these controls 112 are mounted on the bracket 36 (FIG. 4). The controls 112 are, of course, operated by means of the knobs 21. The tuner 116 for the receiver is positioned in the upper left corner of the subassembly 40 as viewed from the back, and this tuner includes shafts 116*a* which are adjustable by means of knobs 22 and 23.

The encircling frame 50 and the component chassis 90 are maintained in spaced parallel relationship by means of the struts or brackets 35 and 46. A further strut or bracket 120 extends between each side of frame 50 and chassis 90 (FIG. 4) and the housing for tuner 116 is secured by means of threaded fasteners between the chassis 90 and the frame 50 on the left hand side of the subassembly.

In summary of the mechanical construction of the two section subassembly 40, it may be observed that the cathode ray tube 70 is clamped in the encircling frame 50 and supported solely in this frame section and the frame 50 is secured to the upright component chassis 90, or second section, by means of struts or brackets extending therebetween on the top, bottom and sides of the subassembly. Therefore, the entire receiver may be a completely operative and self-contained unit when in the unenclosed condition and this will facilitate alignment of the various circuits all of which will have their various adjustable provisions available externally of the subassembly and this provides a compact unit easily handled and tested during manufacture.

The only component of the entire television receiver which may not be mounted in the subassembly is the loudspeaker (not shown) which may more appropriately be mounted directly to the cabinet housing 16 and behind the decorative grill 125 (FIG. 2). Leads of suitable length and of the type which use solderless connectors extend between the subassembly 40 and the loudspeaker to facilitate testing and disassembly of the receiver.

It should further be pointed out that the construction of the subassembly utilizing the cathode ray tube mounting and the component chassis interconnected by means of struts or brackets will provide a relatively open arrangement of components in the vertical direction and therefore will promote airflow and heat dissipation among the receiver components. This tends to improve component life and promote satisfactory operation. In order to assist ventilation of the receiver, a few small apertures may be formed in the bottom of the cabinet housing 16 and the escutcheon plate 18 may include a ventilating grill work 127 for escape of the heat. Furthermore, the left side of the cabinet housing 16, as viewed from the front, may include a grille identical to speaker grille 125, and this is adjacent the high voltage rectifier system using components 105 and 106 to permit introduction of further ventilating air on the warmer side of the subassembly. A vent grille 129 is near the top of the receiver back and a further grille (not shown) is positioned in the back on the side opposite to door 42.

In servicing the television receiver it should be observed that a great number of the components and associated test points are available on the outwardly facing sides of the subassembly 40 including the rearwardly facing surface of the panel-like component chassis 90. However, there will also be a considerable number of components on the forward facing surface of chassis 90 and some of these may be relatively inaccessible due to the close spacing thereof with the rearward side of the cathode ray tube 70. To facilitate access to these, the component chassis 90 may be separated from the clamp mounting of the cathode ray tube by removing the fasteners holding the struts or brackets 35, 46 and 120 and the tuner 116 to the frame 50. The connecting leads 130 (FIG. 2) extending to the base pins of the cathode ray tube are detachable and the leads from the deflection yoke 132, mounted on the neck of the cathode ray tube may be detached by means of a plug and socket connection 134 (FIG. 3). Therefore, by demounting the frame 50 and disconnecting the cathode ray tube, this subassembly may be repositioned facing the opposite direction with the back side thereof facing the normally rearwardly facing surface of chassis 90. Then the plug type connections to this tube may be re-established so that it is fully operative. In this form all of the components on the normally forward facing surface of the chassis 90 will be entirely accessible for test purposes.

Attention will now be directed to FIGS. 10 and 11 which show the construction of the latch 30 for securing the protective cover 28 to the rim of bezel 14. As previously stated, it is desirable from the esthetic standpoint that the receiver 10 include no unattractive means for permitting the fastening of cover 28. Accordingly, the latch 30 is engageable with the rearwardly facing rim 14*a* of the bezel, and when the cover 28 is unlatched the receiver has a normal appearance with no indication whatsoever that a cover can or need be utilized with the receiver.

The latch 30 includes an enclosure member 140 having an extended and forwardly rounded back edge which forms a hook or lip 141 to engage the rim 14*a* of bezel 14. All of the sides of the member 140 are turned inwardly to enclose a retaining strip 144 within this member. Strip 144 is wedged within the sides of the interior of member 140 and includes a central extension 146 which subtends an acute angle with respect to the face of member 140. Extension 146 is spring biased toward the projection 149 of the guide member 150. This limits the amount by which the springs 152, 154 can urge member 140 in a forward direction to maintain the latch assembled.

The compression springs 152 and 154 are surrounded in the axial direction by means of a retaining member 155 which partially encircles each of these springs to retain them upon the guide member 150 which also partially encircles these springs. The springs 152, 154 are compressed between an outwardly turned edge 157 of the guide member 150 and the forward facing side of the member 140 which is opposite the side of lip 141 thereof. The guide member 150 and the retaining member 155 are both secured by means of two rivets to the rim 30 of the cover 28. The springs 152 and 154 urge the member 140 forward or to the left in both FIGS. 10 and 11 which thus hooks lip 141 on rim 14*a* and clamps the rim 30 of cover 28 against the forwardly facing edge of bezel 14. To detach the clamps 30 (one on each side of cover 28) the member 140 is manually urged against the springs 152, 154 disengaging the bezel rim 14*a* and the lip 141 so that the spring action of extension 146 against member 155 ,FIG. 11) pivots the end of member 140 outwardly to permit this member to clear the rim 14*a*.

The member 140 is limited to movement in a direction substantially in alignment with the longitudinal axes of springs 152, 154 by means of a pair of inwardly turned projections 160 which extend from, and are integral with, the upper and lower sides of the member 140 as seen in FIG. 10. The projections 160 extend parallel to the rim 30 of cover 28 and are positioned intermediate the rim 30 and the projections 162 of the retaining member 150. Since the retaining member 150 is secured by means of rivets to the rim 30 this forms a mounting means for the member 140 and various other parts of the latch such that the latch mechanism is substantially entirely enclosed by the member 140 and its inwardly bent sides. There is, of course, sufficient spacing between the rim 30 and the projections 162 to permit the member 140 to slide to the right and left (in FIG. 10) as it is unlatched or latched from the bezel 14.

In the assembly of the latch 30, the guide member 150 and the retaining member 155 are riveted to the rim 30 and the springs 152, 154 are positioned in the portions of members 150, 155 which surrounds these springs. The member 140, together with the retaining strip 144 positioned therein, is then moved into place with the projections 160, 162 forming an effective track for sliding movement of the member and the springs 152, 154 spring bias the member 140 so that the extension 146 engages the projection 149 (FIG. 11). This final assembly operation is possible since as shown in FIG. 10 the projections 160 of the member 140 extends only part way along the sides of the member 140 in the axial direction of springs 152, 154 thus leaving a gap in the inward side of the member 140 at the forward section thereof. Thus, the member 140 may be positioned with the projection 162 extending into this gap and there is sufficient resilience of extension 146 that it may ride over the projection 149 as the member 140 is moved forwardly (to the right in FIG. 10) to position the projections 160 under the projections 162 of the guide member 150. To disassemble the latch a suitable tool such as a screwdriver may be inserted in the open portion adjacent the lip 141 thereof and this tool may be used to depress the extension 146 such that it will clear the projection 149 and the member 140 may be moved to the left to permit disengagement of the projections 160, 162. Accordingly, the described latch is of a simple and economical type which is virtually completely free of visible external operative parts or unattractive apertures or appurtenances.

The present invention, therefore provides a television receiver assembly which may be constructed as a compact and portable unit which presents an attractive appearance and yet maintains a simplified, economical and sturdy mechanical construction. Due to the relatively small number of structural and cabinet components necessary the receiver is both economical to manufacture and assemble. Furthermore, the device lends itself to disassembly in an expedient manner for service or repair. It should also be obvious that the entire device is formed in a way to provide an extremely rugged construction to withstand portable usage to which a transistorized battery-type television receiver would be subjected.

We claim:

1. A television receiver assembly including in combination, frame means having television receiver circuit components including a cathode ray tube supported thereby to form an operative unitary subassembly exclusive of housing means therefor, said cathode ray tube having a screen forming a front of said subassembly and said components and said frame means extending rearwardly of said screen with a panel substantially parallel to said screen carrying the circuit components, a bezel encircling the periphery of said screen and removably secured to said frame means, and a one-piece cabinet housing removably fitted to said bezel and enclosing substantially all of said receiver assembly rearwardly of said bezel including the bottom, the sides and back, and at least part of the top thereof.

2. A television receiver assembly including in combination, frame means having television receiver circuit components including a cathode ray tube supported thereby to form an operative unitary subassembly, said cathode ray tube having a screen and a transparent protective window forming a front of said subassembly and said components and said frame means extending rearwardly of said screen, a bezel encircling the periphery of said screen and removably secured to said frame means, a cabinet housing removably fitted to said bezel about the rearward periphery thereof and enclosing all of said receiver assembly rearwardly of said bezel including the top, bottom, sides and back thereof, a carrying handle secured to said frame means, and an opaque protective cover detachably clipped to the forward side of said bezel and extending over the entire surface of said screen.

3. A portable television receiver assembly including in combination, frame means having television receiver circuit components including a cathode ray tube supported thereby to form an operative unitary subassembly exclusive of housing means therefor, said cathode ray tube having a screen forming a front of said subassembly and said components and said frame means extending rearwardly of said screen, said subassembly having television controls positioned along a top side thereof, a bezel encircling the periphery of said screen and removably secured to said frame means, a unitary molded cabinet housing removably fitted to said bezel and enclosing said receiver assembly rearwardly of said bezel including all of the bottom, sides and back thereof and partially enclosing the top thereof, and a handle and escutcheon assembly directly secured to said frame and enclosing the remainder of the top of said receiver assembly.

4. A television receiver assembly including in combination, frame means having television receiver circuit components including a cathode ray tube supported thereby to form a unitary subassembly, said cathode ray tube having a screen forming a front of said subassembly and said components and said frame means extending rearwardly of said screen, a bezel encircling the periphery of said screen and removably secured to said frame means, said bezel having an inwardly slanted ledge around the inner side thereof and adjacent the front edge of said bezel, a transparent window extending over said screen and having a peripheral lip slanted complementary to said ledge, means for urging said lip into engagement with said ledge for retaining said window within said bezel, and a one-piece cabinet housing removably fitted to said bezel and enclosing said receiver assembly rearwardly of said bezel.

5. A television receiver assembly including in combination, frame means for supporting television receiver circuit components including a cathode ray tube to form an operative unitary subassembly, said frame means having an upright panel-like chassis with circuit components supported thereon, said frame means further having a frame portion aligned with said chassis and surrounding said cathode ray tube and projections therefrom extending partially across the front of said cathode ray tube, clamping means removably secured to said frame portion and engageable with said cathode ray tube rearwardly of the screen thereof for urging said cathode ray tube against said projections whereby removal of said clamping means permits demounting of said cathode ray tube, said frame means having spaced brackets joining said chassis and detachably secured to said frame portion, said chassis thereby being separable from said frame portion, said circuit components and said cathode ray tube forming a fully operable television receiver when connected and so separated to facilitate servicing thereof, a bezel encircling the periphery of said screen and removably secured to said frame portion and a molded cabinet housing removably fitted to said bezel and enclosing the bottom, back, sides and at least part of the top of said receiver assembly rearwardly of said bezel.

6. A portable television receiver assembly including in combination, two section frame means having television receiver circuit components including a cathode ray tube secured to one frame section and further components supported on the other frame section, frame portions joining said frame sections to form a unitary subassembly, said cathode ray tube having a screen forming a front of said subassembly, a bezel encircling the periphery of said screen and removably secured to said frame means, a transparent protective window extending over the entire front of said receiver, a molded cabinet housing removably fitted to said bezel and enclosing said receiver assembly rearwardly of said bezel including the bottom, sides and back thereof and partially enclosing the top thereof, said subassembly having controls for said receiver assembly extending from an unenclosed portion of said top, an escutcheon plate enclosing said top and attached to said frame to provide a panel for said controls, and a removable opaque protective cover for said screen of said cathode ray tube including spring biased latches for clipping said cover to said bezel.

7. A portable television receiver assembly including in combination an operative unitary subassembly including a cathode ray tube and television receiver circuit components, a carrying handle attached to said subassembly, a molded cabinet housing for said subassembly, a bezel encircling the periphery of said cathode ray tube and including a transparent window forming the entire front area for said receiver, a removable opaque protective cover for the front area of said receiver, and spring biased latches for securing said cover to said bezel, said latches each having spring retainer and track means secured to said cover, spring means carried by said spring retainer and track means, and a latch member enclosing said spring means and said spring retainer and track means, said latch member being engageable with said track means and adapted to be spring clipped to the rearwardly facing edge of said bezel, said latch member further having a stop to restrict movement thereof by said spring means to retain said latch member in an assembled condition.

References Cited in the file of this patent

UNITED STATES PATENTS

| | | |
|---|---|---|
| 2,648,724 | Einslein | Aug. 11, 1953 |
| 2,737,649 | Pifer | Mar. 6, 1956 |
| 2,870,438 | Solheim | Jan. 20, 1959 |
| 2,917,577 | Harman | Dec. 15, 1959 |
| 2,929,667 | Jackson | Mar. 22, 1960 |
| 2,986,600 | Pifer | May 30, 1961 |

FOREIGN PATENTS

| | | |
|---|---|---|
| 204,093 | Austria | Dec. 15, 1958 |